United States Patent [19]

Kobayashi

[11] Patent Number: 4,602,675
[45] Date of Patent: Jul. 29, 1986

[54] AIR CONDITIONER FOR AUTOMOTIVE VEHICLE OR THE LIKE

[75] Inventor: Shinma Kobayashi, Hiratsuka, Japan

[73] Assignee: Nissan Shatai Company, Limited, Hiratsuka, Japan

[21] Appl. No.: 527,785

[22] Filed: Aug. 30, 1983

[30] Foreign Application Priority Data

Sep. 10, 1982 [JP] Japan .................... 57-156720

[51] Int. Cl.$^4$ .................................. F25B 29/00
[52] U.S. Cl. .................................. 165/16; 236/49; 165/43
[58] Field of Search .................. 165/12, 16, 30, 40, 165/41, 42, 43, 39; 236/13, 49, 91 R, 91 C, 91 F; 62/239, 243, 244; 98/2.01, 2.11; 237/12.3 A, 12.3 B

[56] References Cited

U.S. PATENT DOCUMENTS

| | | | |
|---|---|---|---|
| 2,189,895 | 2/1940 | Grutzner | 237/2 A |
| 3,658,244 | 4/1972 | Caldwell | 237/2 A |
| 3,814,173 | 6/1974 | Coon | 165/12 |
| 3,934,642 | 1/1976 | Coulson et al. | 165/29 X |
| 4,311,188 | 1/1982 | Kojima et al. | 165/2 |
| 4,323,111 | 4/1982 | Iijima | 165/25 |
| 4,325,426 | 4/1982 | Otsuka et al. | 165/2 |
| 4,337,821 | 7/1982 | Saito | 165/12 |
| 4,344,565 | 8/1982 | Kojima et al. | 236/46 R |
| 4,368,843 | 1/1983 | Kai et al. | 236/49 |
| 4,383,642 | 5/1983 | Sumikawa | 237/12.3 A |
| 4,401,149 | 8/1983 | Iijima et al. | 165/122 |
| 4,406,397 | 9/1983 | Kamata et al. | 236/1 B |
| 4,407,446 | 10/1983 | Iijima et al. | 236/49 |
| 4,407,447 | 10/1983 | Sayegh | 236/49 |
| 4,408,713 | 10/1983 | Iijima et al. | 236/49 |
| 4,416,324 | 11/1983 | Sutoh et al. | 165/12 |
| 4,417,618 | 11/1983 | Yoshimi et al. | 165/12 |
| 4,417,688 | 11/1983 | Schnaibel et al. | 236/91 F |
| 4,448,035 | 5/1984 | Moriyama et al. | 62/176.6 |
| 4,456,166 | 6/1984 | Kogohata | 236/13 |
| 4,460,036 | 7/1984 | Yoshimi et al. | 62/244 X |
| 4,473,109 | 9/1984 | Kojima et al. | 165/12 |
| 4,478,274 | 10/1984 | Naganoma et al. | 165/12 |

FOREIGN PATENT DOCUMENTS

| | | |
|---|---|---|
| 2204508 | 8/1973 | Fed. Rep. of Germany . |
| 53-18142 | 2/1978 | Japan . |
| 55-123516 | 9/1980 | Japan . |
| 57-77210 | 5/1982 | Japan . |
| 58-145518 | 8/1983 | Japan . |
| 2090966 | 7/1982 | United Kingdom . |

Primary Examiner—Harry Tanner
Attorney, Agent, or Firm—Schwartz, Jeffery, Schwaab, Mack, Blumenthal & Evans

[57] ABSTRACT

An air conditioning unit is directed by a control program which causes it to be sensitive to various internal and external factors affecting the upper and lower cabin environments and is particularly characterized by a blower control which, during initial automatic air conditioner operation, holds the blower energization at a low level (1) in summer so that until cool air is available, hot air is not forcefully discharged into a hot cabin, (2) in winter when both the upper and lower regions are cold and only after a given minimal engine coolant temperature has been sensed to prevent strong drafts of insufficiently heated air, and (3) in winter when the lower region is cold but the upper region is warmed by sunshine, in which case air is blown only into the upper region.

5 Claims, 4 Drawing Figures

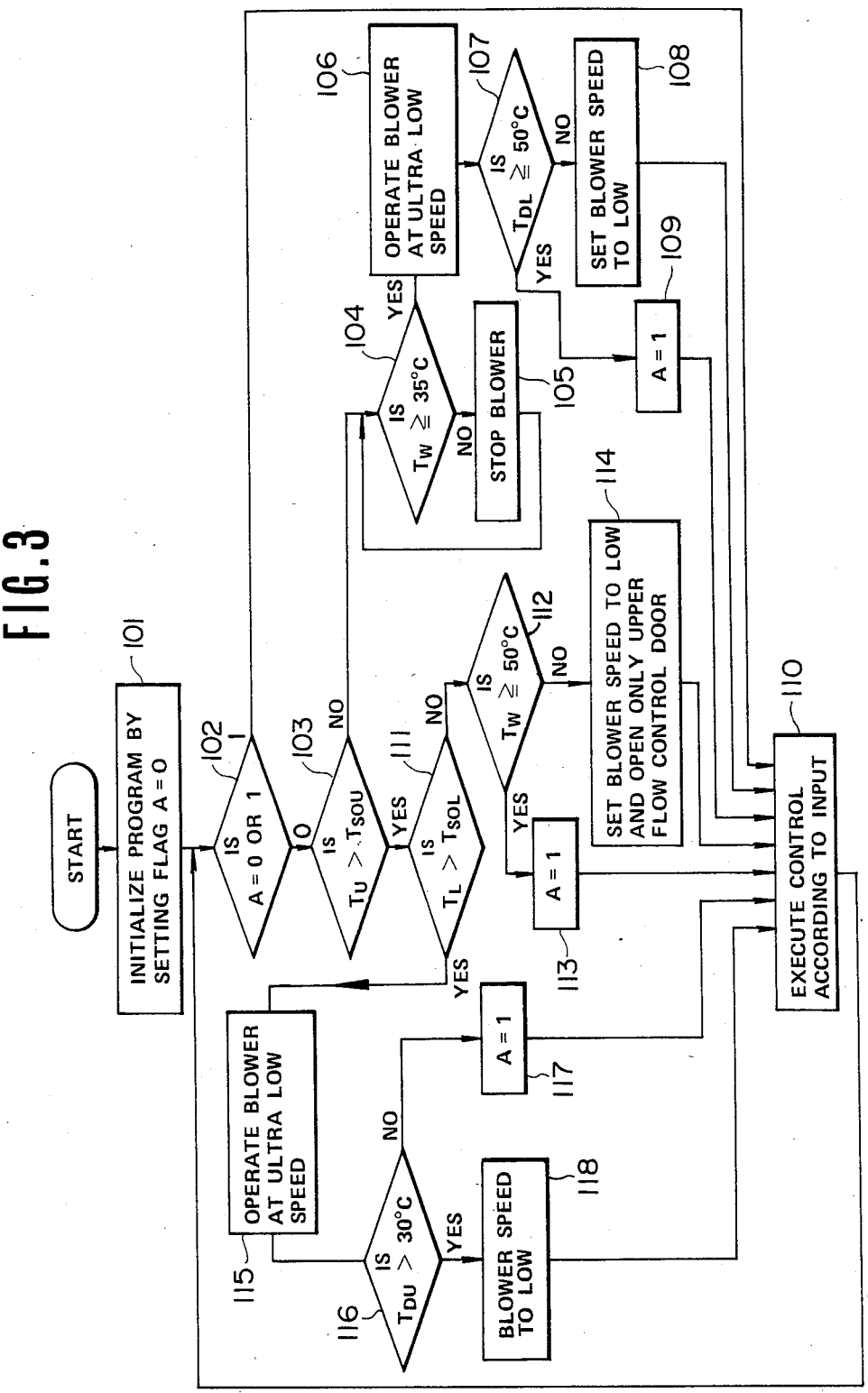

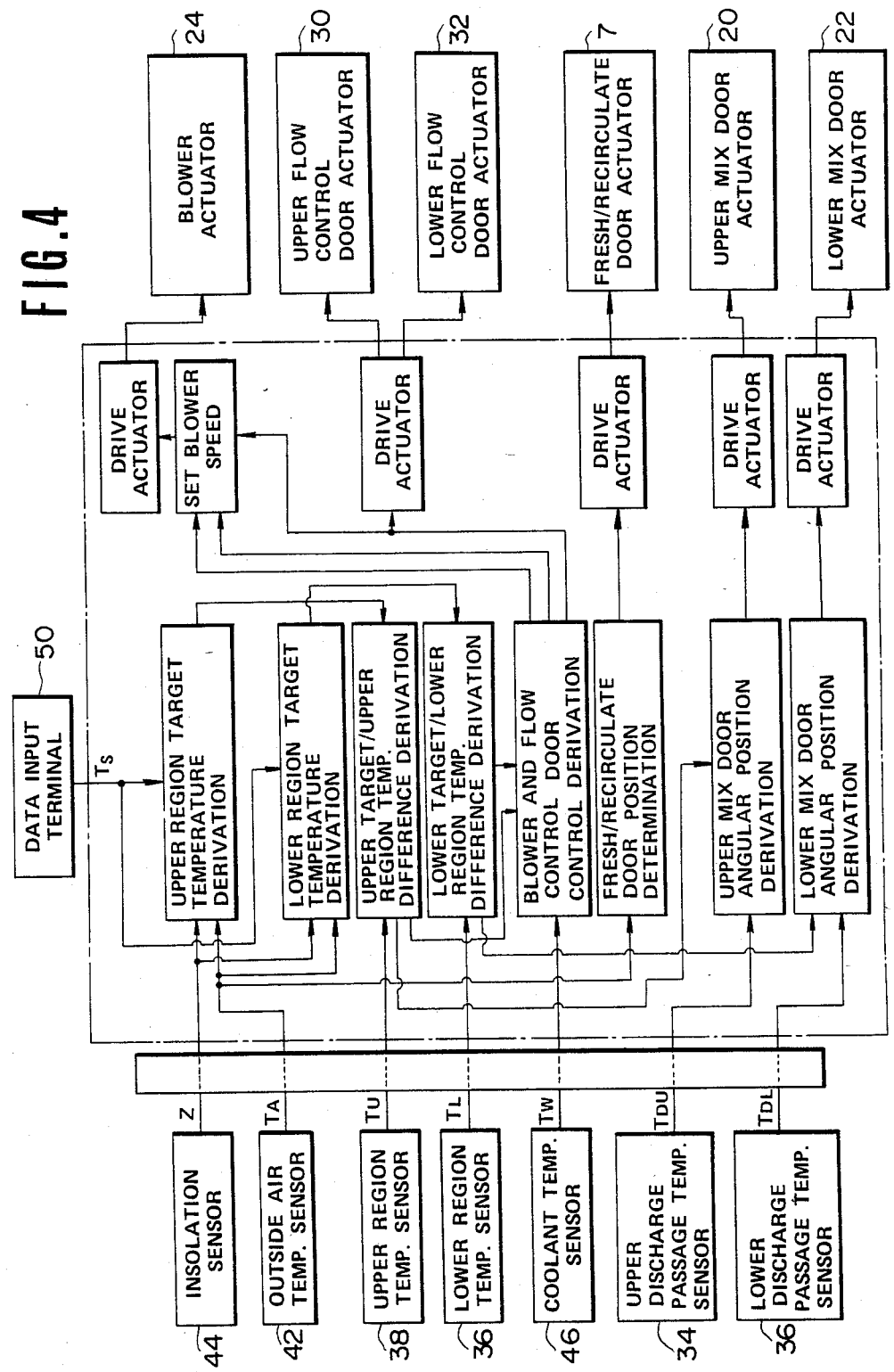

AIR CONDITIONER FOR AUTOMOTIVE VEHICLE OR THE LIKE

BACKGROUND OF THE INVENTION

1. Field of the Invention

The present invention relates generally to an air conditioner for an enclosed space such as the cabin of an automotive vehicle or the like, and more specifically to an improved arrangement which controls the cabin environment in response to various factors affecting same.

2. Description of the Prior Art

In a previously proposed air conditioning arrangement for an automotive vehicle, it has been proposed to discharge the same temperature air into both the upper and the lower sections or regions of the cabin in an effort to acheive a uniform temperature throughout the cabin. However, in the winter, for example, on sunny days, even though the temperature of the air in the lower region about the legs of the cabin passengers tends to be appropriately controlled, the upper region is, under such conditions, additionally heated by the solar energy entering thereinto, whereby the temperature of the upper region of the cabin tends to rise undesirably above that required. In the summer the reverse situation, wherein the lower section tends to be overly cooled, occurs.

Furthermore, with the above mentioned arrangement, during cold engine starts in cold weather, in order to avoid blowing cold air into both the upper and lower regions of the cabin, the air conditioner blower is (during automatic operation mode) not energized until the temperature of the engine coolant has risen sufficiently to enable adequate heating of the air. However, this delay tends to induce concern in the user that the air conditioner is in fact not functioning properly.

SUMMARY OF THE INVENTION

It is an object of the present invention to provide an air conditioning unit for an enclosed space such as an automotive vehicle cabin wherein the temperature in both the upper and lower regions of the space can be simultanously maintained at suitable temperatures irrespective of variations in external influences.

It is a further object of the present invention to provide an arrangement which energizes the air conditioner blower as soon as practical in view of the various factors affecting the environment of the enclosed space (cabin) and in a manner to minimize passenger discomfort.

In brief the present invention features an air conditioning unit incorporating a microcomputer programmed to make the unit sensitive to various internal and external factors affecting the upper and lower cabin environments and particularly characterized by a blower control which, during initial automatic air conditioner operation, holds the blower energization at a low level:

(1) in summer so that until cool air is available, hot air is not forcefully discharged into a hot cabin, (2) in winter when both the upper and lower regions are cold and only after a given minimal engine coolant temperature has been sensed to prevent strong drafts of insufficiently heated air, and (3) in winter when the lower region is cold but the upper region is warmed by sunshine, in which case air is blown only into the upper region.

More specifically, a first aspect of the present invention takes the form of an air conditioning unit for conditioning the air in an enclosed space having an upper region and a lower region, comprising: a duct having an upstream end into which air is inducted and a bifurcate downstream end defining upper and lower discharge passages through which air is separately discharged into the upper and lower regions respectively; a blower associated with the duct for blowing air therethrough; a heat exchanging arrangement including a cooling device for cooling the air in the duct and a heating device for heating the air in the duct; a first flow control arrangement associated with the bifurcate downstream end of the duct for selectively and individually controlling the amount of air flowing through the upper and lower discharge passages which is exposed to the heat exchanging arrangement in a manner that the temperature of the air is varied; a second flow control arrangement for controlling the amount of air discharged through the upper and lower discharge passages into the upper and lower regions, respectively; a sensor arrangement including devices for sensing the temperature of the air in the upper region and the temperature of the air in the lower region and outputting an indication thereof; an input device for outputting an indication of the temperature required in the enclosed space; and a circuit responsive to the outputs of the sensor arrangement and the input device for controlling the operation of the blower, the first flow control arrangement and the second flow control arrangement in a manner to maintain the temperature in the upper region and the temperature in the lower region at the temperature indicated by the output of the input device.

A further aspect of the invention resides in that the circuit which controls the operation of the air conditioning unit is arranged to calculate upper and lower target temperatures, which are the temperatures of the air which must be discharged through the upper and lower discharge passages respectively in order to achieve the temperature indicated by the output of the input device, and further arranged to control the operation of the blower in a manner that when:

(1) the temperature in the upper region and the temperature in the lower region are both above the respective target temperatures, the blower is energized;

(2) the temperature in the upper region and the lower region are both lower than the corresponding target temperatures, the blower is:

(a) not energized when a heat capacity sensing sensor associated with the heat exchanging arrangement indicates the heating capacity of the heating device is below a first predetermined level;

(b) energized at a first low level when the heat capacity sensing sensor indicates the heating capacity is between the first predetermined level and a second predetermined level; and (c) normally energized when the heat capacity sensing sensor indicates that the heating capacity of the heating device is above the second predetermined level; and (3) the temperature of the upper region is greater than the corresponding target temperature while the temperature of the lower region is lower than the corresponding target temperature, the blower is energized at the first low level and the second flow control arrangement is operated to permit air to be discharged through the first discharge passage only.

BRIEF DESCRIPTION OF THE DRAWINGS

The features and advantages of the arrangement of the present invention will become more clearly appreciated from the following description taken in conjunction with the accompanying drawings in which:

FIG. 3 is a flowchart showing in more detail the procedure basically outlined in FIG. 2; and FIG. 4 is a schematic representation showing in self explanatory functional terms the operations performed within the microcomputer shown in FIG. 1, and the various operative connections between the microcomputer, the various sensors and actuators illustrated in said Figure.

DETAILED DESCRIPTION OF THE PREFERRED EMBODIMENT

Figure 1:
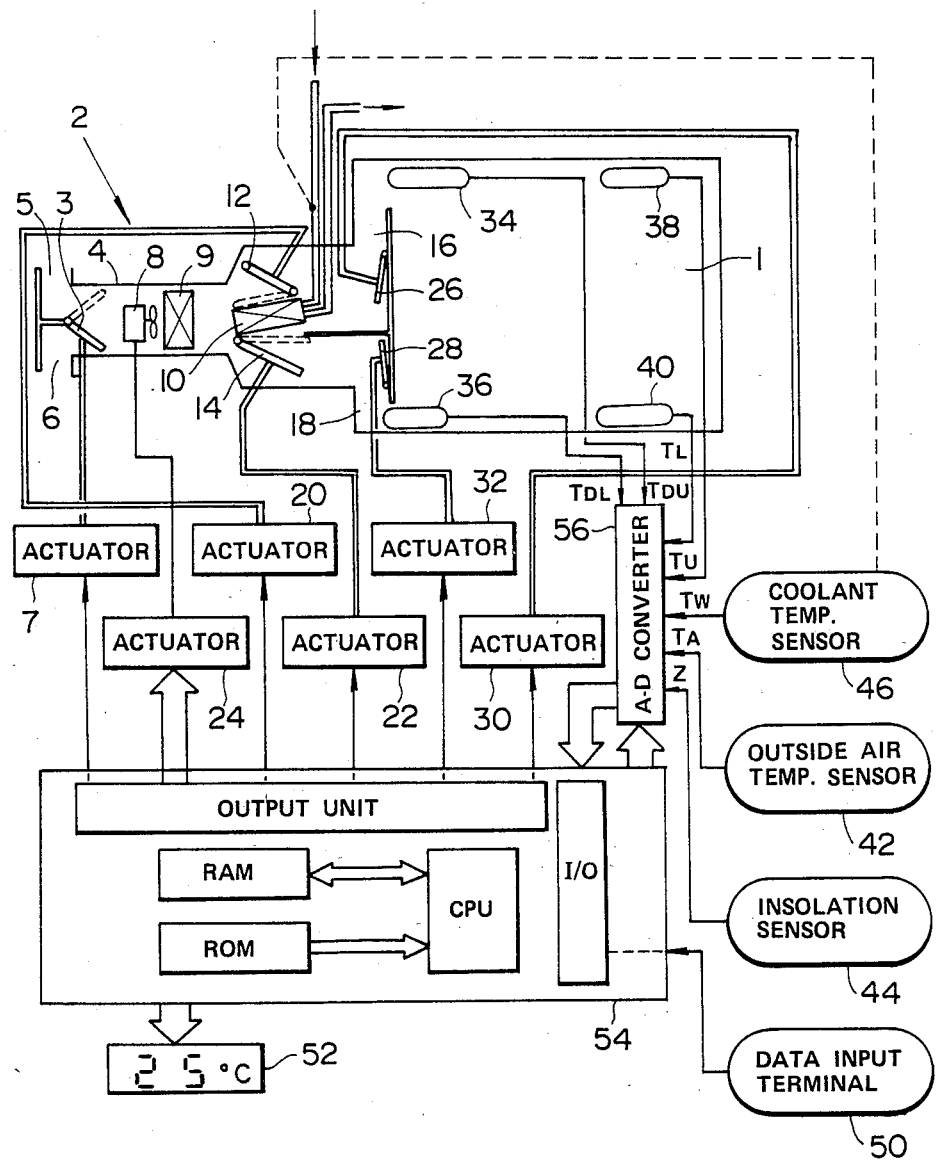
FIG. 1 is schematic view of an air conditioning arrangement according to the present invention.

Turning now to the drawings, FIG. 1 shows an embodiment of the present invention. In this arrangement, "air-conditioned air" is discharged into an enclosed space such as a vehicle cabin 1 or the like, by an air conditioning unit generally indicated by the numeral 2. This air conditioning system or unit is, by way of example, the type wherein air may be selectively inducted from (a) the ambient atmosphere surrounding the cabin or (b) from the cabin 1 per se, to be recirculated back thereinto, via a door 3 mounted at or near the upstream end of a duct 4. The duct is as shown, provided with an atmospheric air induction port 5 and a recirculation port 6. The position of the door 3 is controlled by an acuator 7.

Located down stream of the door 3 is a fan or blower 8.

Located downstream of the blower 8 is an evaporator 9 via which heat may be extracted from the air forced to flow through the duct 4 by the blower 8.

Further downstream of the evaporator 9 is a heater core 10 through which heated engine coolant is circulated. As illustrated, the heater core is arranged at a location just upsteam of a branching or bifurcation of the duct 4.

Upper and lower mix doors 12 and 14 are arranged to vary the respective fractions of the air flows passing through each of the upper and lower sub passages 16 and 18 of the duct arrangement, which fractions pass over and/or through the heater core 10 to be heated by same. By controlling the angular position of these doors (12,14) the temperature of the air being discharged into the cabin through each of the sub passages 16, 18 can be individually controlled. Viz., in the heating mode, by controlling the angular position of each of the doors 12, 14, the amount of air being heated by the heater core 10 can be controlled in a manner to control final the temperature of the air discharged from each sub passage; while in the cooling mode the temperature of the air is firstly reduced to a suitably low level via use of the evaporator 9 and then subsequently slightly warmed during its passage through the sub passages 16, 18, to acheive the appropriate temperatures.

The angular positions of the upper and lower mix doors 12 and 14 are controlled by actuators 20, 22, respectively.

The operation of the blower 8 is controlled by an actuator 24.

Upper and lower flow control doors 26, 28 are provided in each of the sub passages 16, 18 downstream of the mixing doors 12 and 14 respectively. These flow control doors 26, 28 are controlled by actuators 30, 32 respectively, in a manner to vary the amount of air permitted to pass through each of the sub passages 16, 18 and even cut-off the flow through a sub passage in the event such control is required.

Temperature sensors 34, 36 are disposed in, or arranged with respect to, the sub passages 16, 18 in a manner to sense the temperature of the air being discharged therefrom into the upper and lower regions or zones of the cabin 1.

In addition to the "duct" sensors 34, 36 as they will be referred to hereinafter, temperature sensors 38, 40 for sensing the temperatures in the upper and lower regions of the cabin are provided.

In order to sense the various external influences on the environment of the cabin, an outside or ambient atmosphere temperature sensor 42 and a insolation sensor 44 are provided. The outside air temperature sensor 42 may be disposed in a bumper of the vehicle (not shown) by way example, so as to be located in a shaded but well ventilated position. The insolation sensor 44, on the other hand may be disposed internally on top of the vehicle dash panel just aft of the windshield or externally on the cowl top grill forward of the windshield. Of course it is within the purview of the present invention to use a plurality of insolation sensors so that the effect of the sunlight entering through the rear windshield may be additionally determined. However, for simplicity of explantion only one such sensor will be referred to.

An engine coolant temperature sensor 46 is provided to sense the temperature of the coolant via which the heating of the air is accomplished.

To enable the passenger or passengers of the vehicle to select the temperature to which the air in the cabin is to be controlled, an data input terminal is provided. In this instance the terminal is adapted to output a digital signal. This terminal may be provided with a LED display or the like 52 to enable ready discernment of the temperature which has been selected and/or the various temperatures sensed inside and outside of the vehicle.

In this embodiment a microcomputer 54 is arranged to receive data input via a A-D converter 56 from the above mentioned sensors. The output of the data input terminal 50 may, of course, in this case be fed directly to the I/O of the microcomputer 54 due to its digital nature. As shown, the microcomputer includes a RAM, a ROM and a CPU and is suitably programmed to control the actuators (7, 20, 22, 24, 30, 32) based on the data input from the various sensors.

Figure 2:
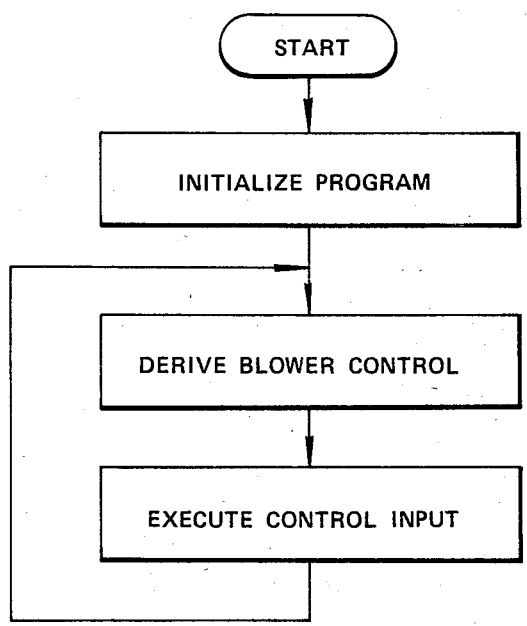
FIG. 2 is a flowchart showing in simplified form some of the operations which characterize the present invention.

One of the highlights of the present invention is deemed to come in the control of the blower 8. The steps via which the blower is controlled are shown in FIG. 2 and in more detail in FIG. 3.

In this embodiment the microcomputer 54 is programmed to, after the "START" which is induced by switching the air conditioning unit on to its automatic mode, in step 101 to set a flag of A=0 so as to ensure that the "warm up" program as it will be referred to, will be carried out at least once.

In step 102 the program enquires as to the status of the flag A. Viz., it determines whether A is one or zero. In the event that A is zero, then the program proceeds to step 103 wherein the upper cabin temperature ($T_U$) sensed by sensor 38 is compared with a target temperature $T_{sou}$ for the upper region of the cabin (viz., the temperature of the air which must be discharged from the upper sub passage 16 in order to obtain the desired temperature ($T_S$) in that zone.

If the answer to question posed in step 103 is NO, then the program shifts into a heating mode and proceeds to step 104 wherein the temperature of the coolant ($T_W$) (sensed by sensor 46) is compared with a first predetermined value (which is 35 degrees C. merely by way of example). In the event that the coolant temperature ($T_W$) is below 35 degrees C., the program issues a command in step 105 to not energize the blower. This routine continues until such time as the coolant temperature ($T_W$) is equal to or greater than the nominal 35 degrees C., whereafter in step 106 the program energizes the blow 8 at a minimal or ultra low level. Thereafter, in step 107 the program enquires as to whether the temperature ($T_{DL}$) of the air being discharged from the lower sub passage 18 is equal to or greater than a second nominal value of 50 degrees C.

In the event that the temperature of the air being discharged from the lower duct or discharge passage 8 is less than 50 degrees, the blower speed is set in step 108 to a low value (higher than the ultra low minimal value of step 106) so as to gently discharge air into the lower section or region of the cabin and avoid strong drafts of insufficiently heated air. However, in the instance that the temperature of the air being discharged from the lower discharge sub passage or duct 18 as it will be referred to hereinafter, the program (in step 109) sets the flag A to 1, and proceeds to enter what is in this case a normal control routine in step 110.

In the event that the answer to the question posed in step 103 is YES, that is to say, the the temperature in the upper region ($T_U$) of the cabin is above the corresponding target temperature ($T_{SOU}$), then the program proceeds to step 111 wherein the enquiry is made as to whether the temperature ($T_L$) in the lower region or section of the cabin is above or below the corresponding target temperature ($T_{SOL}$). In the event that the temperature of the lower section is less than the target temperature, the program enters the heating mode and in step 112 determines if the temperature of the engine coolant is equal to or greater than the second nominal value of 50 degrees C. If the answer to this enquiry is YES then the program proceeds in step 113 to set flag A to 1 and goes to step 110. However, if the answer to the enquiry is NO then the program in step 114 sets the blower speed to low and closes the lower duct flow control door 28.

In the event that the answer to the question posed in step 111 is YES, that is to say, the temperature in the lower section ($T_L$) is greater than the corresponding target temperature ($T_{SOL}$), then the program enters a cooling mode and in step 115 energizes the blower 8 at the aforementioned ultra low speed. Subsequently, the temperature of the air ($T_{DU}$) being discharged from the upper duct 16 is sensed and compared in step 116 with a nominal value of 30 degrees C. If the temperature of the air being discharged is less than 30 degrees, the program sets flag A to 1 in step 117 and then goes on to enter normal control in step 110. However, in the event that the temperature of the air being discharged from the upper duct 16 is greater than 30 degrees the blower 8 is set in step 118 to "low" so as to temporarily avoid blowing hot air unwantedly into the hot cabin 1.

The program is arranged to recycle from step 110 to step 102. Thus, until the flag A is set to 1, the low blower speed operation (see steps 108, 114, 118,) will be maintained. Of course, upon the flag A being set to "1" the "warm up" program is by-passed and normal control established.

The above mentioned target temperatures $T_{SOU}$ and $T_{SOL}$ may be calculated using the following equations:

$$T_{SOU} = T_S + K_{1U}T_A + K_{2U}Z \tag{1}$$

$$T_{SOL} = T_S + K_{1L}T_A + K_{2L}Z \tag{2}$$

wherein:
$T_S$ is the desired cabin temperature;
$K_{1U}$ and $K_{2U}$ are constants specifically pertaining to the upper level temperature control;
Z is the degree of insolation to which the cabin is subjected; and
$K_{1L}$ and $K_{2L}$ are constants specifically pertaining to the lower level temperature control.

Of course it will be appreciated that the calculation of the above mentioned target temperatures is an easy matter for those skilled in that art and that all of the data necessary for the computation is being constantly fed to the microcomputer. It is deemed advantageous, although not shown in the flowchart, to recalculate the target temperatures on a regular basis so as to take into account the changes in ambient conditions such as are apt to occur when a vehicle ascends a mountain or day turns to night, for example.

FIG. 4 shows in schematic form the functions performed by the microcomputer shown in FIG. 1. It will however be appreciated that each of the functional blocks may be replaced with suitable digital and/or analog circuits in the event it is required to construct such an embodiment.

What is claimed is:
1. An air conditioning unit for conditioning the air in an enclosed space having an upper region and a lower region, comprising:
a duct having an upstream end into which air is inducted and bifurcate downstream end defining upper and lower discharge passages through which air is separately discharged into said upper and lower regions respectively;
a blower associated with said duct for blowing air therethrough;
a heat exchanging arrangement including a cooling device for cooling the air in said duct and a heating device for heating the air in said duct;
a first flow control arrangement associated with said bifurcate downstream end of said duct for selectively and individually controlling the amount of air flowing through said upper and lower discharge passages which is exposed to said heat exchanging arrangement in a manner such that the temperature of said air is varied;
a second flow control arrangement for controlling the amount of air discharged through said upper and lower discharge passages into said upper and lower regions, respectively;
a sensor arrangement including devices for sensing the temperature of the air in said upper region and the temperature of the air in said lower region and outputting an indication thereof;

a sensor for sensing the heat capacity of said heating device and outputting an indication thereof;

an input device for outputting an indication of the temperature required in said enclosed space; and a circuit responsive to the outputs of said sensor arrangement and said input device for controlling the operation of said blower, said first flow control arrangement and said second flow control arrangement in a manner to maintain the temperature in said upper region and the temperature in said lower region at the temperature indicated by the output of said input device, said circuit being arranged to calculate upper and lower target temperatures, said upper and lower target temperatures being the temperatures of the air which must be discharged through said upper and lower discharge passages respectively in order to achieve the temperature indicated by the output of said input device, and further arranged to control the operation of said blower in a manner that when:

(1) the temperature in said upper region and the temperature in said lower region are both above the respective target temperatures, said blower is energized, (2) the temperature in said upper region and said lower region are both lower than the corresponding target temperatures, said blower is:

(a) not energized when said heat capacity sensing sensor indicates the heating capacity of said heating device is below a first predetermined level, (b) energized at a low level when said heat capacity sensing sensor indicates the heating capacity is between said first predetermined level and a second predetermined level, and (c) normally energized when said heat capacity sensing sensor indicates that the heating capacity of said heating device is above said second predetermined level, and (3) the temperature of said upper region is greater than the corresponding target temperature while the temperature of said lower region is lower than the corresponding target temperature, said blower is energized at said first low level and said second flow control arrangement is operated to permit air to be discharged through said upper discharge passage only.

2. An air conditioning device as claimed in claim 1, wherein when said blower is energized under the conditions wherein the temperatures in said upper and lower regions are both above the respective upper and lower target temperatures, said blower is energized at a low level until the air being discharged through said upper and lower discharge passages has fallen to a predetermined level whereafter the blower is normally energized.

3. An air conditioning unit as claimed in claim 1, wherein said circuit takes the form of a microcomputer having a RAM, a ROM and a CPU incorporated therein, said microcomputer being programmed to calculate said upper and lower target temperatures.

4. A method of operating an air conditioning unit which is arranged to condition the air in an enclosed space having an upper region and a lower region, comprising the steps of:

discharging air separately into said upper and lower regions through a duct arrangement including upper and lower discharge passages;

blowing air through said duct arrangement using a blower;

controlling the temperature of the air flowing through said duct arrangement using a heat exchanging arrangement including a cooling device and a heating device;

controlling the temperature of the air discharged through said upper discharge passage and said lower discharge passage using a first flow control arrangement which varies the amount of air the temperature of which is varied by said heat exchanging arrangement;

controlling the amount of air discharged through said upper and lower discharge passages using a second flow control arrangement;

sensing the temperature in said upper region and in said lower region and outputting an indication thereof;

sensing a heat capacity of said heating device by means of a sensor;

determining the temperature to which the enclosed space should be controlled using an input device;

calculating upper and lower target temperatures, which upper and lower target temperatures represent the temperatures of the air which must be discharged through said upper and lower discharge passages respectively to achieve the determined temperture;

controlling the operation of said blower, said first flow control arrangement and said second flow control arrangement in a manner to maintain the temperature in said upper region and in said lower region at the determined temperature; and controlling the operation of said blower so that when:

(1) the temperature in said upper region are both above the respective target temperatures, said blower is energized, (2) the temperature in said upper region and said lower region are both lower than the corresponding target temperatures, said blower is:

(a) not energized when said heat capacity sensing sensor indicates the heating capacity of said heating device is below a first predetermined level, (b) energized at a first low level when said heat capacity sensing sensor indicates the heating capacity is between said first predetermined level and a second predetermined level, and (c) normally energized when said heat capacity sensing sensor indicates that the heating capacity of said heating device is above said second predetermined level, and (3) the temperature of said upper region is greater than the corresponding target temperature while the temperature of said lower region is lower than the corresponding target temperature, said blower is energized at said first low level and said second flow control arrangement is operated to permit air to be discharged through said first discharge passage only.

5. A method as claimed in claim 4 further comprising the step of controlling said blower in a manner that when said temperatures in said upper and lower regions are both above the respective target temperatures, said blower is energized at a low level until the air being discharge through said upper and lower discharge passages has fallen to a predetermined level whereafter the blower is normally energized.

* * * * *